(12) United States Patent
Peterson et al.

(10) Patent No.: US 6,170,515 B1
(45) Date of Patent: Jan. 9, 2001

(54) PIPING MANIFOLD WITH QUICK CONNECT COUPLERS

(75) Inventors: Michael J. Peterson, Nashville; Richard M. Russell, Brentwood, both of TN (US)

(73) Assignee: Parmenlo, LLC, Nashville, TN (US)

(*) Notice: Under 35 U.S.C. 154(b), the term of this patent shall be extended for 0 days.

(21) Appl. No.: 09/339,434

(22) Filed: Jun. 24, 1999

(51) Int. Cl.[7] ................................................. F16K 11/00
(52) U.S. Cl. ........................................ 137/271; 285/135.1
(58) Field of Search ................................. 137/884, 271; 285/124.3, 124.4, 135.1

(56) References Cited

U.S. PATENT DOCUMENTS

| | | | |
|---|---|---|---|
| 3,076,473 | * | 2/1963 | Wadey ................................. 137/271 |
| 3,561,469 | * | 2/1971 | Kellstrom ............................ 137/884 |
| 3,698,432 | * | 10/1972 | Kutz ..................................... 137/884 |
| 4,103,936 | | 8/1978 | Sutcliffe et al. . |
| 4,846,506 | | 7/1989 | Bocson et al. . |
| 5,092,364 | | 3/1992 | Mullins . |
| 5,294,154 | | 3/1994 | Le Devehat . |
| 5,316,347 | | 5/1994 | Arosio . |
| 5,505,496 | | 4/1996 | Nishida et al. . |
| 5,507,529 | | 4/1996 | Martins . |

OTHER PUBLICATIONS

Walther Präzision catalog (1996).

* cited by examiner

Primary Examiner—John Fox
(74) Attorney, Agent, or Firm—Lucian Wayne Beavers Waddey & Patterson (57) ABSTRACT

A manifold system includes an array of conduit outlets fixed in position relative to each other. A fluid connector has two quick connect devices mounted thereon and communicated through a hollow handle, so that a selected pair of the conduit outlets can be placed in fluid communication with each other by simultaneous engagement of the quick connect devices with the selected pair of conduit outlets.

17 Claims, 5 Drawing Sheets

PIPING MANIFOLD WITH QUICK CONNECT COUPLERS

BACKGROUND OF THE INVENTION

1. Field of the Invention

The present invention relates generally to manifolding systems providing selective connection between selected ones of a plurality of conduits of a plumbing system.

2. Description of the Prior Art

There are many situations in which a system of plumbing is provided with a manifold arrangement having a plurality of interconnected pipes and a plurality of valves which control the flow between selected ones of the pipes. In such a system, two selected pipes are typically connected by opening a valve between them, and they are disconnected by closing the valve. Due to the need to provide selective connection of a given pipe with more than one other pipe, such a manifold typically includes a plurality of valves and piping connections associated with each fluid conduit so as to provide selective connection of that conduit with other conduits by opening and closing the appropriate ones of the valves.

One problem with such a prior art system is that the flow paths which are open at any given point in time may not be visually apparent, and it may be necessary to determine which valves are open and which valves are closed, in order to ascertain that the piping system is in its proper orientation. It is also possible with such a prior art system to accidentally leave a valve in the wrong position which can lead to disastrous consequences.

Accordingly, there is a need for a manifold system which provides a visual indication of the operable connections between selected conduits, while at the same time providing speed and ease of making selected connections.

SUMMARY OF THE INVENTION

The present invention provides a manifold system which includes an array of conduit outlets fixed in position relative to each other. A fluid connector has two quick connect devices mounted thereon so that a selected pair of the conduit outlets can be placed in fluid communication with each other by simultaneous engagement of the quick connect devices with the selected pair of conduit outlets.

Preferably the quick connect devices are self-sealing devices so that when the fluid connector is removed, all of the associated fluid outlets automatically close themselves. Thus, the presence of the fluid connector between two selected fluid outlets on a manifold panel will be a positive and immediate visual indication that the two outlets are in fluid communication with each other. Correspondingly, the absence of such a fluid connector provides a positive visual indication that there is no fluid communication between any two outlets in question.

The fluid connector may include a handle which has a fluid flow passage defined therethrough and has the two quick connect devices connected to the ends of the fluid passage. The handle may have associated therewith an actuator which actuates locking devices of the fluid connectors so that a human operator may grab the handle and simultaneously actuate the locking devices of the two fluid connectors so as to allow the connector apparatus to be easily pushed in place upon the manifold to connect two selected fluid outlets.

It is therefore, an object of the present invention to provide methods and apparatus for selectively connecting chosen fluid outlets of a manifold system.

Another object of the present invention is the provision of a manifold system which provides a visual indication of the fluid connection between outlets of the manifold system.

Still another object of the present invention is the provision of such apparatus for use in a healthcare environment wherein the positive and accurate identification of existing fluid connections is critical to safe operation of the system.

Another object of the present invention is the provision of a manifolding system which is simple to construct, low in maintenance and economical.

Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
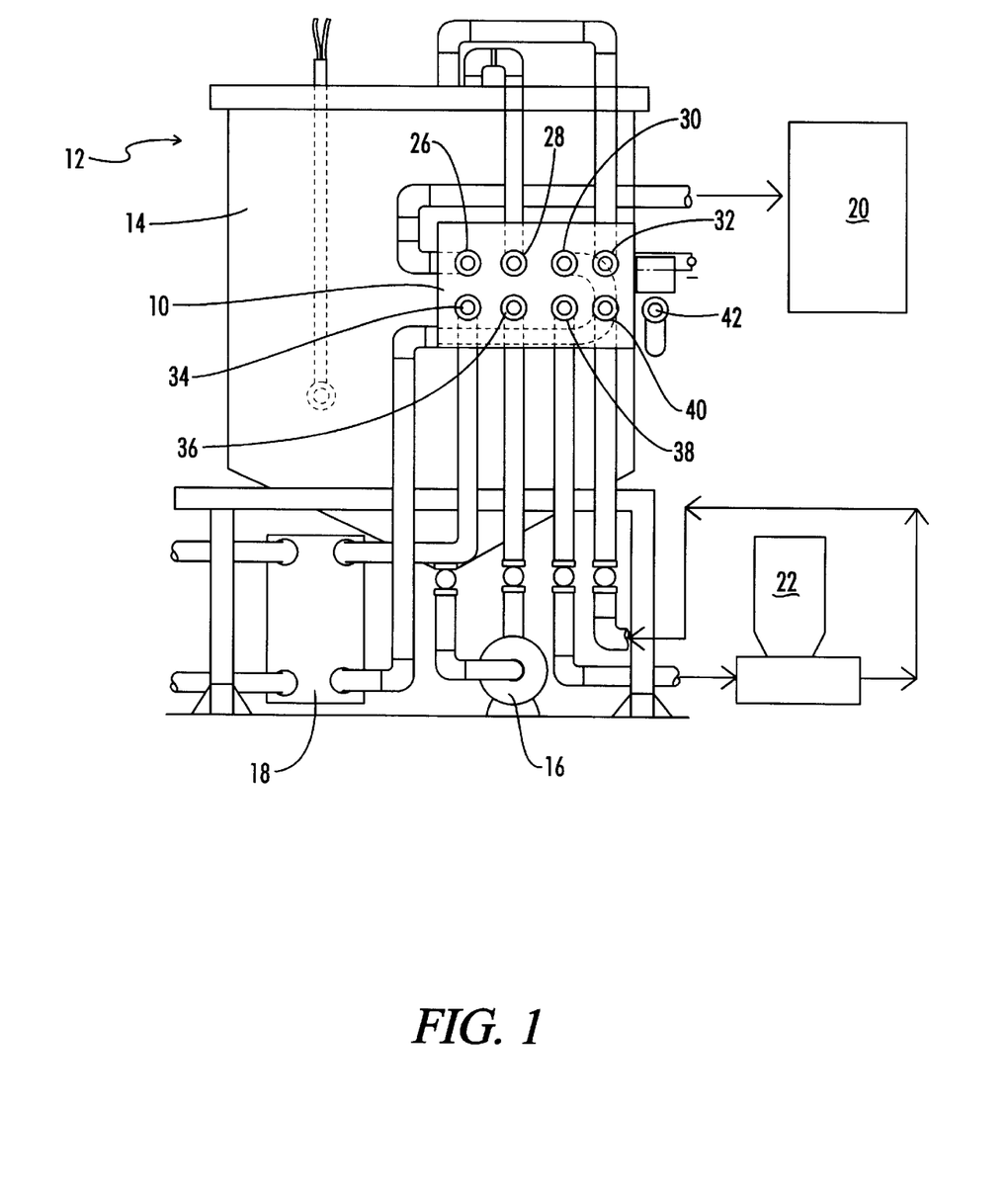
FIG. 1 is an elevation view of a portion of a bicarbonate mixing system for a dialysis clinic, wherein the various conduits of the system are connected to a manifold panel using fluid connectors of the present invention.

Referring now to the drawings, and particularly to FIG. 1, a manifold system of the present invention is shown and generally designated by the numeral 10. In the example shown in FIG. 1, the manifold system 10 is a part of a bicarbonate mixing system 12 for a dialysis clinic.

As will be understood by those skilled in the art, dialysis is a technique by which the blood of persons suffering from kidney disease may be purified. As part of a dialysis treatment, it is necessary to provide very precise mixtures of pure water and certain additives to the dialysis process.

In this or any other healthcare environment, it is obviously critical that the appropriate fluid connections be made within the system.

Due to the fact that such a system must be constructed so that it can be flushed and cleaned periodically, such systems include conduits which are connected to cleaning chemicals and the like which should not be connected to those lines which supply fluids to the dialysis machines.

In the system 12 illustrated, a mixing tank 14, a pump 16 and a heat exchanger 18 are shown. Also schematically illustrated are a mix tank 20 and a dry additive hopper tank 22.

Preferably, all of the various piping conduits of the system 12 are connected to the manifold system 10.

Figure 2:
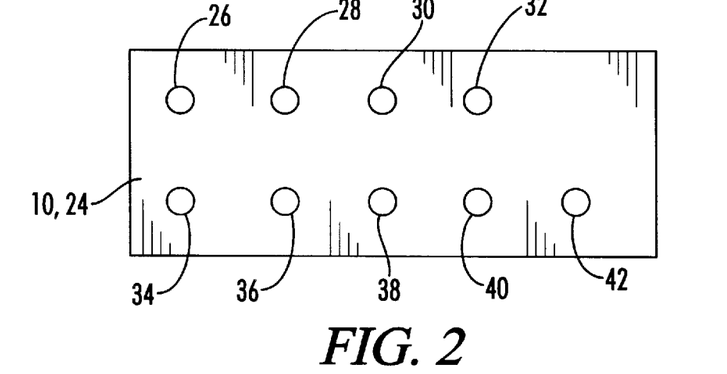
FIG. 2 is an elevation view of the manifold panel without any fluid connectors in place.

The manifold system 10 is best illustrated in FIG. 2. The system 10 includes a manifold block 24 which may be constructed from a rectangular shaped sheet of plastic material which has suitable threaded holes bored therein which provide conventional piping connections to the various conduits.

The manifold block 24 shown in FIG. 2 has an array of nine conduit outlets or conduit ports defined therein which have been numbered as 26–42. As is apparent in FIG. 1, each of the outlets 26–42 is connected to one of the various piping conduits of the bicarbonate mixing system 12.

Each of the conduit outlets 2642 of the array faces in a common direction, which is seen in FIG. 2 is in a direction normal to the plane of the drawing and extending out of the plane of the drawing toward the viewer. Furthermore, each of the conduit outlets 26–42 lies in a common plane with the other conduit outlets.

Figure 3:
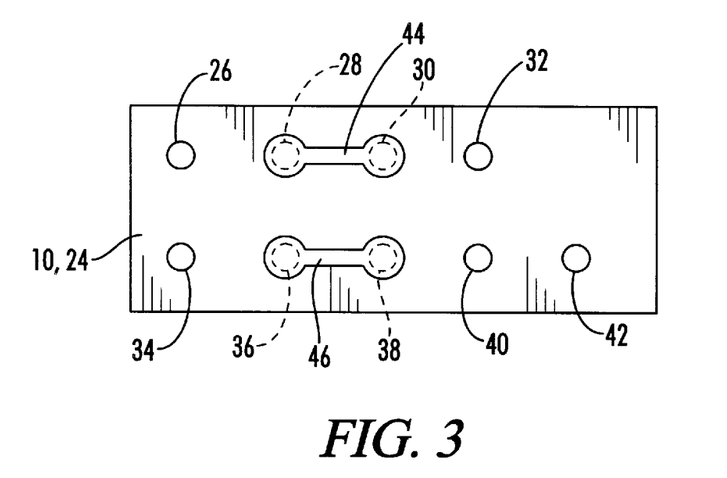
FIG. 3 is an elevation view of the manifold panel of FIG. 2 showing two fluid connectors in place to provide a first mode of operation of the system of FIG. 1.

As is represented in FIG. 3, a fluid connector 44 may be utilized to connect a selected pair of the conduit outlets, in this case, outlets 28 and 30. A second such fluid connector 46 is shown connecting outlets 36 and 38. Thus, FIG. 3 represents one mode of operation of the bicarbonate mixing system 12.

Figure 4:
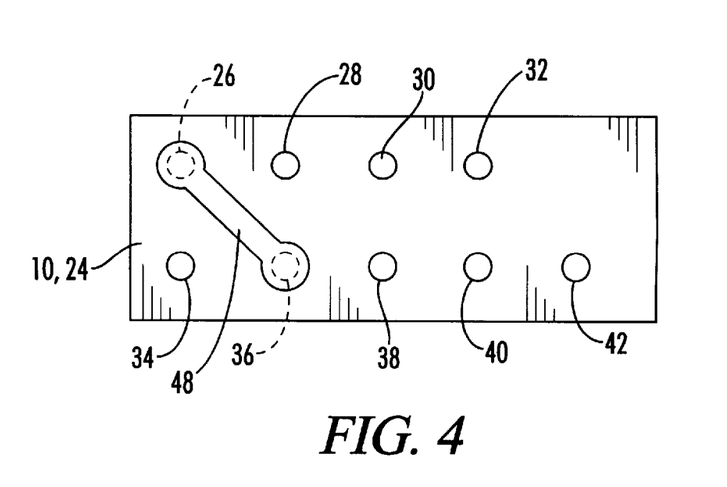
FIG. 4 is an elevation view of the manifold panel of FIG. 2 showing another arrangement of a fluid connector connected to the manifold panel to provide a second mode of operation of the system of FIG. 1.

FIG. 4 illustrates a second mode of operation of the bicarbonate mixing system 12 in which the fluid outlets 26 and 36 are connected by the fluid connector 48.

The first mode of operation represented by FIG. 3 may, for example, be a mixing mode in which liquid is being drawn from the mix tank 14 by pump 16 and discharged through the dry additive hopper 22 and returning to the mix tank 14 so that the fluid is being pumped in a loop and dry additive is being added thereto until the mixture reaches the desired conditions, at which time it will be ready to be discharged to the circulation tank 20.

The second mode represented by FIG. 4 may represent a transfer mode in which the fluid previously flowing in the loop just described with regard to FIG. 2 is pumped by the pump 16 to the circulation tank 20.

Figure 6:
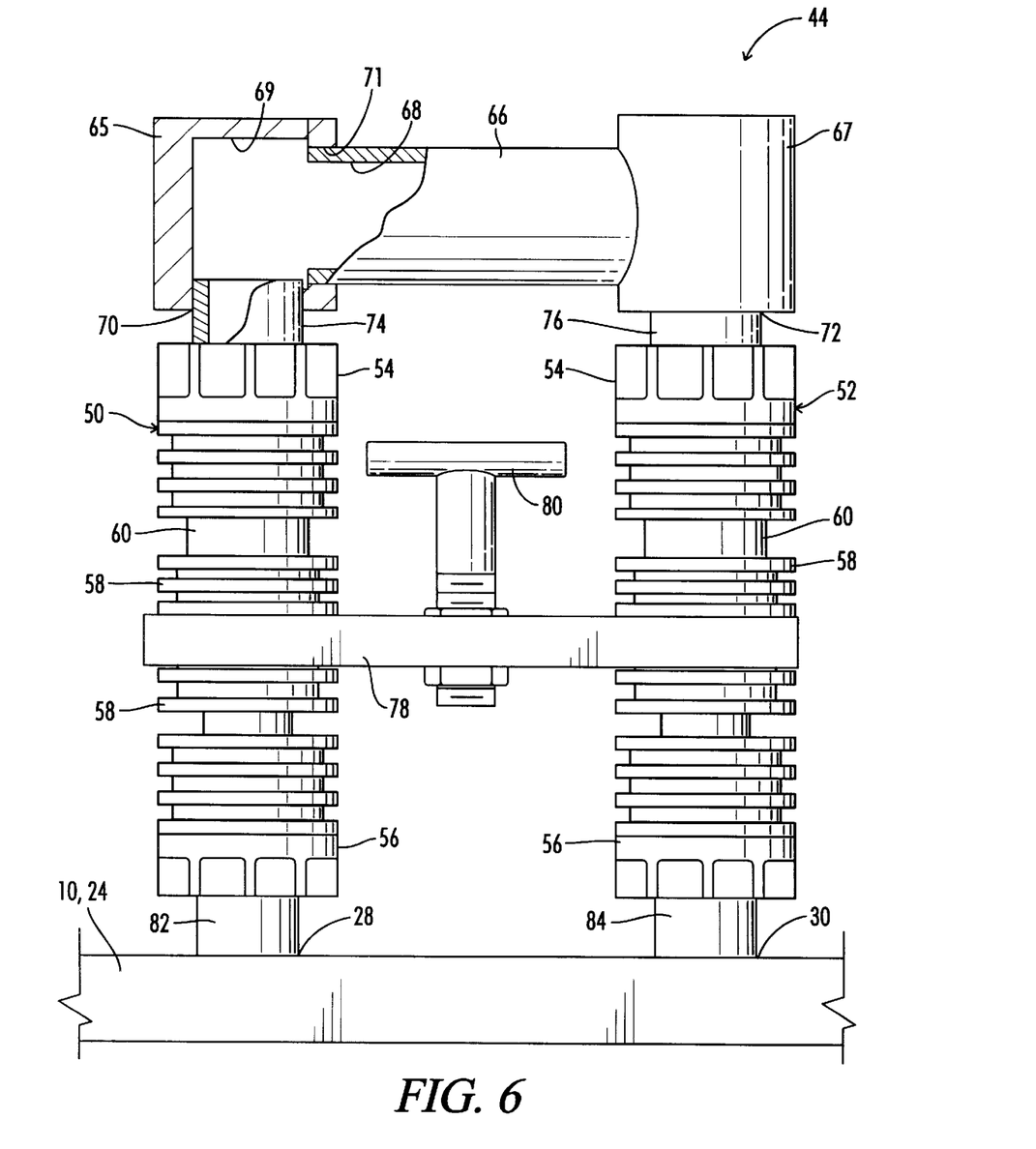
FIG. 6 is a plan view of one of the fluid connectors of FIGS. 3 and 4.

The details of construction of one of the fluid connectors such as fluid connector 44 is shown in FIG. 6.

In order to fully understand the construction and operation of the fluid connector 44, it is useful to first describe the quick connect coupling assemblies that are utilized therewith. The fluid connector 44 includes two quick connect coupler assemblies designated by the numerals 50 and 52. The quick connect coupler assemblies 50 and 52 are themselves a part of the prior art, and may, for example, be of the type manufactured by Walther Prazision as their model 30331-27 Self Sealing Coupling and Self Sealing Adapter Assembly.

Figure 5:
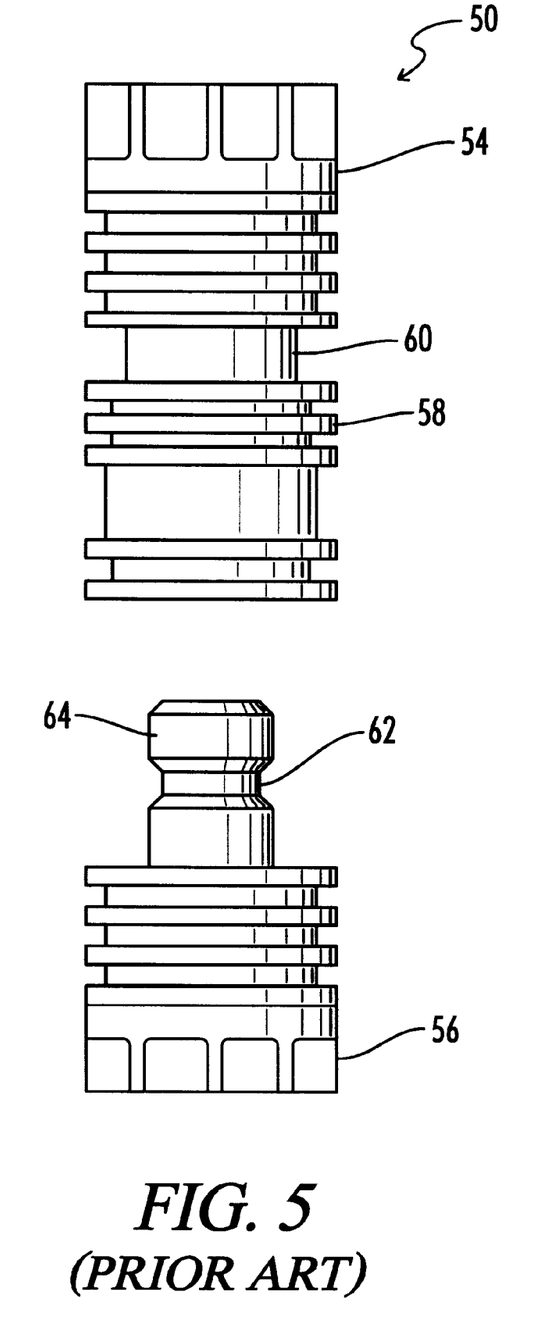
FIG. 5 is an elevation exploded view of a prior art quick connect coupling of the type which may be utilized to construct the apparatus of the present invention.

One such assembly, such as assembly 50, is shown in exploded view in FIG. 5. The quick connect coupling assembly 50 includes a self sealing coupling part 54 and a self sealing adapter part 56.

As will be understood by those skilled in the art, the coupling part 54 and adapter part 56 each include flow passages therethrough which are closed by a spring loaded internal valve mechanism when the parts 54 and 56 are disconnected from each other as shown in FIG. 5, and which flow passages are automatically opened when the parts 54 and 56 are placed in engagement with each other as shown in FIG. 6.

The coupling part 54 includes an actuating collar 58 which is slidable relative to a spool 60 thereof. There is contained within the coupling part 54 a ring of ball bearings which are forced into an inwardly biased position when the collar 56 is in a lower position relative to spool 60, and which are released when the collar 58 is pulled to an upward position relative to spool 60. The inwardly biased ball bearings are designed to be received within a groove 62 defined upon a male member 64 of adapter part 56. Thus, in order to engage the coupling part 54 with the adapter part 56, the collar 58 must slide upward relative to spool 60 to release the ring of ball bearings, thus allowing the coupling part 54 to be fitted down over the male member 64 of adapter part 56. Then, the actuator collar 58 is released and is spring biased back downwardly to cam the ball bearings outward into engagement with the annular groove 62, thus locking the coupling member 54 onto the adapter member 56.

Referring now to FIG. 6, the fluid connector 44 includes a rigid handle 66 which is constructed of a piece of hollow plastic pipe having a flow path 68 defined therethrough and having first and second outlets 70 and 72 of the flow path 68 defined in the handle 66.

The handle 66 includes right angle members 65 and 67 having passages 69 therethrough which communicate the outlet 70 with a lateral outlet 71.

The handle 66 and right angle members 65 and 67 are preferably all formed from a plastic material such as Delrin Acetal, Polypropylene, PTFE or PVDF. The handle 66 is connected to the right angle member 65 and 67 by suitable plastic welding there between or mechanical connections such as threaded male and female connections.

Each of the outlets 70 and 72 has one of the self sealing coupling members 54 connected thereto by pipe nipples 74 and 76, respectively.

The spacing between the fluid outlets such as 28 and 30 is equal to the spacing between the quick connect coupling parts 54 of the fluid connector 44.

The sliding actuator collars 58 of the two self sealing coupling parts 54 are connected by a rigid bracket 78. A T-grip 80 is attached to bracket 78.

In FIG. 6, each of the self sealing coupling parts 54 is shown operably connected to one of the self sealing adapter parts 56 which are in turn mounted upon the outlet ports 28 and 30 with pipe nipples 82 and 84, respectively.

The pipe nipples 74 and 76 and 82 and 84, and the quick connect coupling parts 54 and quick connect adapter parts 56 are all preferably constructed from a plastic material such as Delrin Acetal, Polypropylene, PTFE or PVDF.

The rigid bracket 78 may be constructed of thick plastic sheet, metal, or other suitable material.

The apparatus 44 is constructed so that a human operator can grip the handle 66 with the palm of the operator's hand and can extend the fingers of that same hand to grip the cross-bar portion of T-grip 80 so that by squeezing the fingers, the bracket 78 will simultaneously pull the two actuating collars 58 upward relative to their respective coupling parts 54.

The manifold system 10 will have one of the self sealing adapter parts 56 permanently mounted upon each of the outlets 26–42. Then, when it is desired to connect two of the outlets such as outlets 28 and 30, the fluid connector 44 is grasped in the operator's hand and the T-handle 80 is pulled to move the actuating collars 58 to an unlocked position so that the self sealing coupling parts 54 may be moved into position over the male members 64 of the self sealing adapters 56. Then, the T-handle 80 is released allowing the actuating collars 58 to move downward thus locking the self sealing coupling parts 54 in place upon the self sealing adapter parts 56.

This engagement of the coupling parts 54 with the adapter parts 56 will cause the self sealing internal components of both the coupling parts 54 and adapter parts 56 to open, thus providing fluid communication therebetween.

Thus, when fluid outlets 28 and 30 are connected in the manner illustrated in FIG. 6, fluid can flow from outlet 28 upward through its associated adapter part 56 and coupling part 54 into inlet 70 of handle 66, then through the flow path 68 of handle 66, then out outlet 72 of handle 66, then through the coupling part 54 and adapter part 56 to the outlet 30.

The fluid connector 44 can be described as including first and second connector ports which are the free ends of the quick connect coupling parts 54, which connector ports also face in a common direction. This permits the first and second connector ports to be simultaneously engaged with a selected pair of the fluid outlets.

The presence of the fluid connector 44 between the fluid outlets 28 and 30 upon the manifold block 24 as illustrated in FIG. 3, provides a positive visual indication that there is, in fact, fluid flow communication between outlets 28 and 30. Similarly, the absence of one of the fluid connectors between any two fluid outlets provides a positive visual indication that there is no fluid connection between those outlets.

Thus, for the mode of operation illustrated in FIG. 3, there is a positive indication of fluid flow connection between outlets 28 and 30 by means of the presence of fluid connector 44. Similarly, there is a positive indication of fluid flow connection between outlets 36 and 38 by the presence of fluid connector 46.

Analogously it is apparent in viewing FIG. 3 that there is no fluid flow communication between any of the other fluid outlets associated with the manifold system 10.

Thus, the manifold system 10 utilizing the fluid connectors such as 44, 46 and 48, provides an immediate visual representation of which conduits are connected and which are not connected. This is much superior to an arrangement of valves which are always present and the open or closed position of which may not be readily visually apparent upon a quick inspection.

The fluid connector 44 can be described as a fluid connector 44 having two quick connect devices 54 mounted thereon so that a selected pair 28 and 30 of the conduit outlets can be placed in fluid communication with each other by simultaneous engagement of the quick connect devices 52 with the conduit outlets 28 and 30 via the quick connect adapters 56.

The quick connect coupling part 54 and the quick connect adapter part 56 may be described as first and second parts, respectively, of the two part quick connect assembly 50, the first and second parts 54 and 56 being complementary to each other so that when the first part 54 is pushed into engagement with the second part 56, a fluid connection is created.

The actuating ring 58 may be described as a slidable locking member 58 which must be moved to an open position before the quick connect coupling part 54 can be operably engaged with the quick connect adapter part 56. The bracket 78 may be described as an actuator 78 connecting the slidable locking members 58 of the two quick connect coupling parts 54 of fluid connector 44 so that the two slidable locking members 58 can be simultaneously moved by the actuator bracket 78.

As seen in FIG. 2, the array of fluid outlets 26–42 are arranged on a grid with the outlets at the corners of imaginary squares so that the fluid connectors 44 or 46 can connect any two adjacent outlets of the square, i.e. the fluid connector 44 could connect outlets 26 and 28 or 26 and 34.

The fluid connector 44, however, cannot connect outlets such as 28 and 34 on diagonally opposite corners of the square.

The third fluid connector 48, shown in FIG. 4, is longer than the first and second fluid connectors 44 and 46, so that it can connect diagonally opposite outlets such as 26 and 36. Thus, the length of the connector 48 is equal to the square root of two times the length of the connector 44 or 46.

Figure 7:
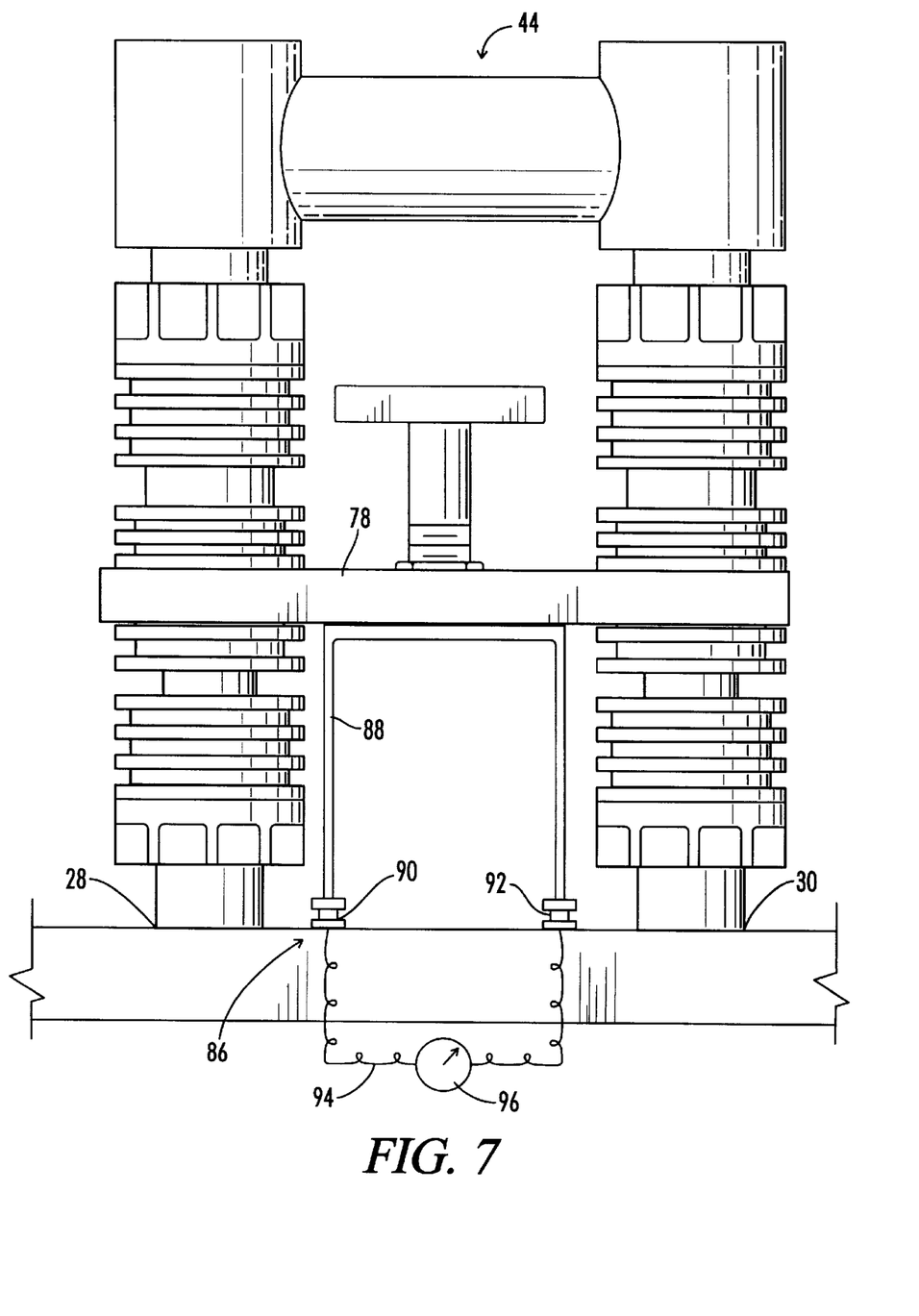
FIG. 7 is a view similar to FIG. 6, which further includes an electrical sensing system for providing an electrical signal indicative of the presence of the fluid connector between two selected outlets of the manifold.

FIG. 7 illustrates an alternative embodiment of the invention which further includes an electrical sensor system 86 for generating a signal indicating which of the outlets of the manifold 10 are connected by the fluid connector 44. In the embodiment shown, an inverted U-shaped electrical conductor 88 is attached to the actuating bracket 78 so that when the fluid connector 44 is in place upon the fluid outlets 28 and 30, the conductor 88 will engage electrical contacts 90 and 92, thus completing an electrical circuit 94 to generate an electrical signal which can be detected or displayed by indicator means 96. Alternatively, the conductor 88 could be replaced by a non-conducting contact member and the electrical contacts 90 and 92 could be replaced by switches. Another alternative would be the use of proximity sensors or other means for generating a signal in response to the presence of the fluid connector 44 or a structure attached thereto.

The signal generated by the system 86 can be utilized to actuate a display on a control board, to actuate an alarm, or to provide data to a recording system which records the time of connection and disconnection of the various fluid connectors with the various fluid outlets of the manifold 10.

METHODS OF OPERATION

The methods of using the fluid connector 44 to connect two of the fluid outlets may be generally described as follows.

The method first includes providing an array of conduit outlets such as 26–42 and providing a rigid connector conduit, such as 44, having a pair of quick connect devices 54 attached thereto.

The human operator grasps the fluid connector 44 with the handle 66 held within the palm of the operator's hand and with the operator's fingers grasping the T-handle 80. The T-handle 80 is then pulled toward the handle 66 to simultaneously slide the sliding actuators 58 of the quick connect coupling parts 54 to unlock the locking members of the coupling parts 54 so that they can be received over the male members of the quick connect adapter parts 56.

The method further includes pushing the pair of quick connect devices 54 into simultaneous engagement with a selected pair such as 28 and 30 of a conduit outlets of the array and thereby communicating the selected pair of conduits through the rigid connector conduit 66.

As the pair of quick connect devices are pushed into simultaneous engagement with the pair of conduit outlets, the self sealing quick connect parts of both the quick connect coupling parts 54 and the quick connect adapter parts 56 are opened to allow fluid flow therethrough.

When it is desired to subsequently disconnect the fluid outlets 28 and 30, the process is reversed. The operator again grasps the fluid connector 44 with the handle 66 in the palm of the hand and with the fingers grasping the T-handle 80. The T-handle 80 is pulled upward to unlock the quick connect coupling parts 54 from the quick connect adapters parts 56, thus allowing the fluid connector 44 to be removed from engagement with the quick connect adapter parts 56. When this occurs, the internal mechanism of both the quick connect coupling parts 54 and the quick connect adapter parts 56 automatically close the flow passages therethrough, thus stopping flow out of or in to any of the components.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claim is:

1. A manifold system, comprising:
    an array of conduit outlets fixed in position relative to each other; and
    a fluid connector having two quick connect devices mounted thereon, so that a selected pair of the conduit outlets can be placed in fluid communication with each other by simultaneous engagement of the quick connect devices with the selected pair of conduit outlets; and wherein:
        the quick connect devices of the fluid connector each include a first part of a two part quick connect assembly;
        each of the conduit outlets includes a second part of the two part quick connect assembly, the first and second parts being complementary to each other so that when one of the first parts is pushed into engagement with one of the second parts, a fluid connection is created;
        each of the first parts includes a slidable locking member which must be moved to an open position before the first part can be operably engaged with one of the second parts; and
        the fluid connector includes an actuator connecting the slidable locking members of the two quick connect devices of the fluid connector, so that the two slidable locking members can be simultaneously moved by the actuator.

2. The system of claim 1, wherein:
    the fluid connector includes a handle, and the handle and the actuator are so arranged and constructed that a human operator can hold the handle in the palm of the operator's hand with the fingers of the operator's hand grasping the actuator.

3. The system of claim 2, wherein:
    the handle is a hollow handle with a flow passage defined therethrough communicating the two quick connect devices of the fluid connector.

4. The system of claim 1, wherein:
    the first and second parts of the two part quick connect assembly are each self sealing parts so that when the first and second parts are separated, each part automatically closes the fluid conduit associated therewith.

5. The system of claim 1, wherein:
    the array of conduit outlets includes at least four outlets arranged at the corners of an imaginary square so that the fluid connector can connect any two adjacent outlets.

6. The system of claim 5, further comprising:
    a second connector having a length equal to the square root of two times the length of the first connector, so that the second connector can connect two diagonally opposite ones of the four outlets.

7. The system of claim 1, further comprising:
    an electrical sensor for generating a signal indicating which of the outlets are connected to the fluid connector.

8. The system of claim 1, wherein:
    each of the conduit outlets of the array faces in a common direction with the other conduit outlets.

9. The system of claim 8, wherein:
    each of the conduit outlets of the array lies in a common plane with the other conduit outlets.

10. The system of claim 1, further comprising:
    a manifold block having the array of conduit outlets defined therein.

11. The system of claim 1, wherein:
    the presence of the fluid connector connected to the selected pair of conduit outlets provides a visual indication of fluid communication between the selected pair of conduit outlets.

12. A quick connect apparatus, comprising:
    a rigid handle having a fluid flow path defined therethrough and having first and second outlets of the flow path defined in the handle;
    first and second quick connect coupling parts attached to the first and second outlets, respectively, each of the coupling parts including a sliding actuator; and
    a rigid bracket connecting the sliding actuators, the bracket being constructed so that a human operator can hold the handle in the palm of the operator's hand with the operator's fingers grasping the bracket to simultaneously operate the two sliding actuators.

13. The apparatus of claim 12, wherein:
    each of the quick connect coupling parts includes a self sealing coupling that closes its associated outlet when the apparatus is not engaged with a mating coupling part.

14. A method of selectively connecting a selected pair of conduits of a plumbing system, comprising:
    (a) providing an array of conduit outlets;
    (b) providing a rigid connector conduit having a pair of quick connect devices attached thereto; and
    (c) pushing the pair of quick connect devices into simultaneous engagement with a selected pair of the conduit outlets of the array and thereby communicating the selected pair of conduits through the rigid connector conduit; and wherein
    in step (b), the quick connect devices include sliding actuators; and the method further comprises:
    prior to step (c), simultaneously sliding the sliding actuators of both of the quick connect devices.

15. The method of claim 14, wherein:
    in step (a), the conduit outlets include self sealing quick connect parts attached thereto which close the outlets when the outlets are not engaged with the quick connect devices of the rigid connector conduit; and
    (c), further includes opening the self sealing quick connect parts.

16. The method of claim 14, further comprising:
    stopping fluid flow between the selected pair of conduits by removing the rigid connector conduit from engagement with the conduit outlets.

17. A manifold system, comprising:
    an array of conduit outlets fixed in position relative to each other;

a fluid connector having two quick connect devices mounted thereon, so that a selected pair of the conduit outlets can be placed in fluid communication with each other by simultaneous engagement of the quick connect devices with the selected pair of conduit outlets; and an electrical sensor for generating a signal indicating which of the outlets are connected to the fluid connector.

* * * * *